Dec. 22, 1959     P. S. MARTIN     2,917,982
CAMERA SHUTTERS
Filed March 7, 1955
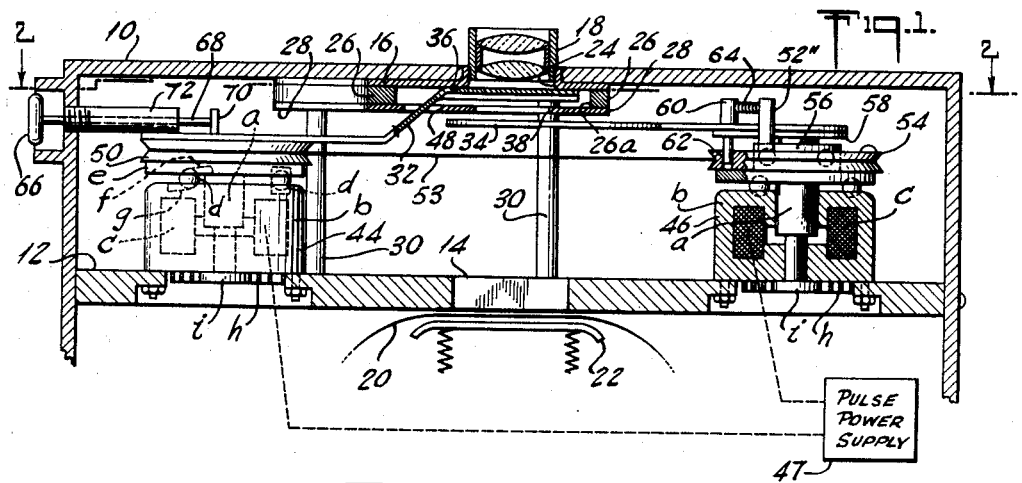
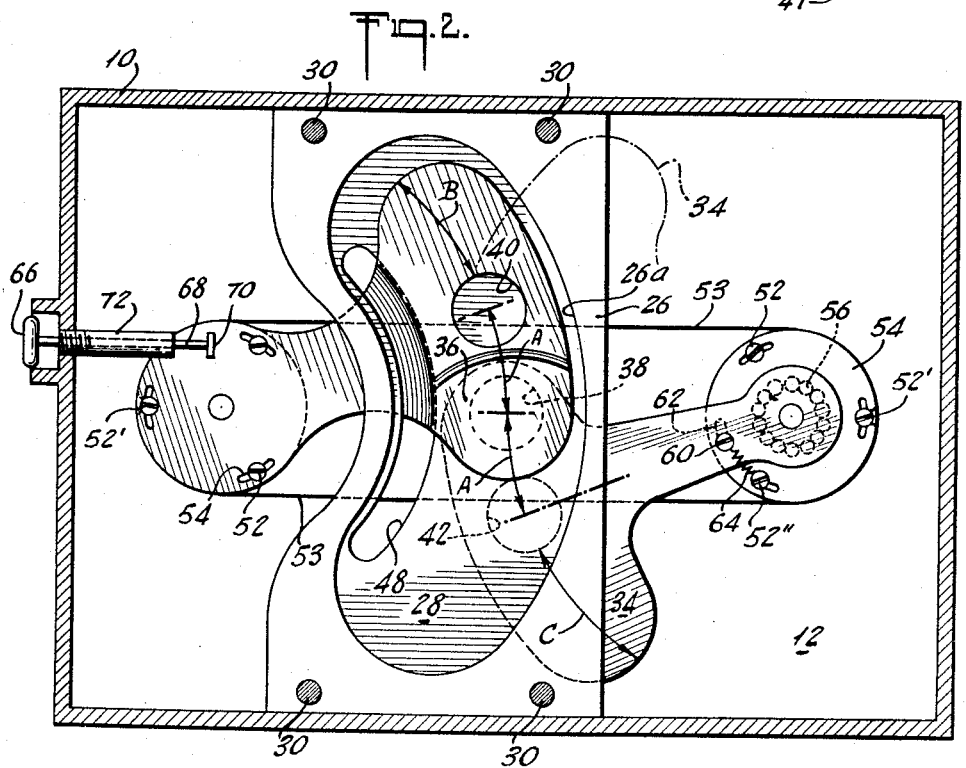
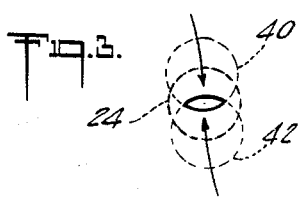
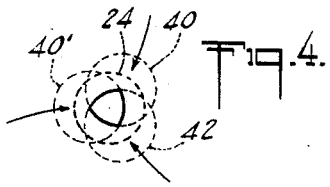
INVENTOR
Paul S. Martin

United States Patent Office 2,917,982
Patented Dec. 22, 1959

2,917,982
CAMERA SHUTTERS

Paul S. Martin, Flushing, N.Y.

Application March 7, 1955, Serial No. 492,341

12 Claims. (Cl. 95—62)

The present invention relates to cameras and in particular to camera shutters.

The broad object is to provide a new and useful shutter. The novel shutter in the illustrative disclosure given below achieves a number of specific objects certain of which may be unnecessary in the application of others. Specific objects achieved are: high speed operation of a shutter of the type that opens outward from the center of the lens opening and closes inward toward the center of the lens opening; high speed operation of a type of shutter that functions adjacent a lens, in contrast to the focal plane type of shutter where high speeds are usually accomplished by progressively exposing the film through a moving slit near the film plane; long life and reliable shutter operation; and low cost and ease of manufacture of a novel shutter involving a bare minimum of parts, which parts are of relatively non-critical form and dimensions.

The foregoing objects and others are accomplished in the illustrative shutter by means of multiple shutter blades that travel in different directions, so that apertures therein move into and out of simultaneous alignment with each other and with the lens opening. Where the blade apertures are of the same width (measured in their direction of travel) as the lens diameter, the shortest exposure time is realized for a full-opening shutter. The exposure time can naturally be adjusted by adjusting the speed of the blades. The exposure time can be increased without change of blade speed by elongating the apertures in their direction of travel. In the extreme, the apertures can be elongated so much that the blades close the lens only in their at-rest position. Where two blades are used, they are operated in opposite directions; where three or more blades are used, they move so that their aperture paths intersect and reach the lens opening simultaneously.

This form of multiple blade shutter is operated, in accordance with one feature of the invention, by electromagnets of the rotary solenoid type, one mounting each blade. With such an arrangement, the electrical energy is transformed into mechanical energy exactly where it is needed. There is no dependence on mechanical energy transmissions from a central source of mechanical energy to the several blades. Such transmissions necessarily introduce energy losses and wear-producing stresses that are obviated where each blade has its own supporting and operating electromagnet.

The electromagnets can be energized in series or parallel in any appropriate manner. For short exposure times, condenser-discharge energization is exemplary. However, despite equal electrical input, different mechanical responses should be expected from the respective electromagnets used. Mechanical synchronization is insured as a further feature of the invention, avoiding the possibility of the apertures in the blades centering on the lens opening at different times. The blade actuators are mechanically interconnected by wires that are curved about oscillatory curved guides to which they are secured. If the advantages of a separate solenoid for each blade were not desired, perhaps because of space limitations, the wires could function as highly efficient energy transmissions from a single source of mechanical energy for all the blades, where each blade has only a rotary bearing. One blade may nonetheless be mounted on a rotary bearing, to drive the other blade or blades.

The solenoid form of shutter operator inherently offers the possibility of shutter reset by nothing more complex than one or more return springs, effective when the applied electrical energy has been dissipated. In the case of apertured blades that both open and close the lens opening during each forward, power stroke of the blades, there normally would be a renewed exposure during the return stroke of the blades, if the blade apertures should be simultaneously aligned with the lens opening during the return stroke. This is avoided by insuring unsynchronized return of the blades. Where multiple independent blade-operating solenoids are used, one solenoid can be energized longer than another for asynchronous return of the blades. However, even where the solenoids are mechanically wired together for synchronized power strokes, delayed return of one of the blades relative to another can still be arranged, as will be seen, for avoiding double exposures.

As a further feature, a manual shutter operator is provided, which is especially useful for keeping the shutter open during focusing of the lens.

Where the rotary solenoid is employed to operate and support the blades, one of the blades can be pressed against an aperture member when at rest so as to be virtually light-tight. The pressure contact is relieved as the rotary solenoid shifts axially when commencing its arcuate operating stroke. This is a concept covered in copending application Serial No. 442,278 filed July 9, 1954, now Patent 2,730,937, by Sidney X. Shore and myself. Notably, however, multiple blades may be carried by multiple rotary solenoids without mutual interference even where the blades are close to each other, since they are all shifted frontally in the same axial motion of their respective rotary solenoids. This feature becomes highly significant as the number of blades employed is increased. Only one need contact the lens-opening member, while the other or others operate free of frictional contact with any other part.

The nature of the invention and further novel features will be appreciated from the following detailed description of an illustrative embodiment of the invention shown in the accompanying drawings. In the drawings:

Fig. 1 is an embodiment of the invention shown in cross-section;

Fig. 2 is a cross-sectional view along the line 2—2 of Fig. 1;

Fig. 3 is a diagram illustrating the start of a shutter-opening operation of the apparatus of Figs. 1 and 2; and Fig. 4 is a similar diagram, modified to show operation of a three-blade shutter.

In Fig. 1, a housing 10 encloses the shutter mechanism to be described, that is carried by a light-tight baffle 12 in which there is formed a rectangular window 14. Baffle 12 is a base plate for the shutter. It carries an apertured member 16 that receives lens assembly 18. The front of housing 10 has a hole through which lens 18 projects, and housing 10 is sealed light-tight against member 16 by suitable tightness and perfection of fit, or with the aid of gaskets (not shown). Film strip 20 is pressed by spring-biased plate 22 against baffle 12 in registry with window 14. The remainder of the film chamber and the film feeding mechanism forming part of the camera are omitted from the drawing as unnecessary to the full understanding of the invention. From the description thus far, it is apparent that, when the shutter is open, an image is projected from lens assembly 18 through window 14 and to film strip 20.

Member 16 has an opening 24 that is closed by the shutter, but which is large enough to pass the image-forming light of lens assembly 18 and which is hereinafter referred to as the lens opening. This member 16 is a plate that is assembled with two other plates 26 and 28 on four rods 30 screwed into the base plate 12. Multiple shutter blades 32 and 34 are disposed with portions thereof interposed between lens assembly 18 and window 14. Blade 32 has a slightly raised flat portion 36 that bears against the flat area of plate 16 in the region of lens opening 24 so as to close off that opening. Any slight light leakage is trapped by the blackened surfaces of plates 16, 26 and 28 which are provided for this purpose. Plate 26 has a kidney-shaped opening 26a in which shutter blade 32 moves freely; and plate 26 is thick enough to accommodate the movement of blade 32 fore-and-aft, as will appear.

Plate 28 has a hole 38 that is centered about the optical axis extending from lens assembly 18 to film 20. Hole 38 is somewhat larger than the diameter of the lens. Shutter blade 34 is disposed below and out of contact with plate 28.

Blades 32 and 34 have respective apertures 40 and 42 therein which are normally off-set from lens opening 24. As shown by the double arrows A in Fig. 2, both blade apertures are equally displaced from the optical axis at the center of hole 38. Each blade has a substantial area beyond the apertures 40 and 42, as represented by double arrows B and C. The latter is the larger of the two, for a purpose to be explained. Portion B can reasonably be reduced to a substantially smaller size than is shown without changing the shutter "open" time.

Blades 32 and 34 are supported and driven in the forward or exposure-making stroke by a pair of rotary solenoids 44 and 46. Each solenoid has an armature $a$ that is slidably and rotatably supported in a bearing formed in housing $b$ of low magnetic reluctance, and a coil $c$ is provided in each. The coils are energized simultaneously, in series or parallel, by a suitable power supply 47. Advantageously this includes a D.-C. charged condenser that is connected to the solenoids through a thyratron or switch contacts. In each solenoid, three ball bearings $d$ at 120° separations are confined between the housing $b$ and an upper plate $e$ rigid with armature $a$. Slanting races $f$ and $g$ receive balls $d$, the races extending along arcs about the axis of armature $a$. When the coils $c$ are energized, armatures $a$ are moved down in a short, fast powerful stroke and at the same time balls $d$ and races $f$, $g$ drive each armature-and-plate assembly $a$—$e$ through a long arcuate stroke. A torsion spring $h$ that is axially compressed is fixed to housing $b$ at one end and at its opposite end spring $h$ is fixed to a headed extension $i$ of armature $a$ for restoring the armature arcuately and axially to the normal, rest position illustrated following each operation. This spring biases plate $e$ against bearings $d$.

Rotary solenoid 44 supports shutter blade 32 and rotary solenoid 46 supports shutter blade 34. Blade 32 extends from below plate 28, slantwise up through slot 48 in plate 28, and then holds flatwise area 36 flatwise against plate 16. Blade 32 is locked against a wheel 50 by screws 52 which also hold wheel 50 rigidly to plate $e$. These screws extend through slots 54 in blade 32, the slots being provided for arcuate adjustment of blade 32. Wheel 50 is conveniently made as a separate lightweight element additional to solenoid plates $e$ to embody a peripheral groove in which there is received a thin strong wire or pair of wires 53 that extends or extend about wheel 50 and about wheel 54 on plate $e$ of solenoid 46, similarly grooved to receive wire 53. The wire is secured to screws 52' so as to be locked to wheels 50 and 54 and to synchronize those two wheels. The place where the wire is anchored is out of the active lengths of wire that are flexed where they bend around the wheels during shutter operation. This arrangement insures that holes 40 and 42 shall cross lens opening 24 at the same time, despite possible differences in the operation of the two solenoids.

It is apparent that these wires could produce drive of one wheel by the other where only one solenoid is employed. However, a separate solenoid for each shutter blade as shown has been found of distinct advantage.

Blade 34 swings with pivoted armature $a$ of its solenoid 46 in the driving direction. However, blade 34 lags behind the reset of the armatures $a$, wheels 50 and 54, blade 32, and wires 53. Area C of shutter blade 34 is thus effective to close off the optical path otherwise opened during the return stroke of hole 40 in blade 32, thereby avoiding a double exposure. Area B of blade 32 closes off hole 42 of blade 34 during the return stroke.

A ball bearing ring 56 is provided which rotatably carries plate 58 above grooved wheel 54. Blade 34 is suitably secured to plate 58. Pin 60 extends rigidly from plate 58 down into a slot 62 in wheel 54. A screw 52'' extends up from wheel 54, and a weak spring 64 tensions screw 60 toward screw 52'', into the at-rest configuration of parts shown. The slots in wheel 54 through which screws 52, 52' and 52'' extend provide for arcuate adjustment of that wheel and of the blade 34 with its driving pin 60.

When solenoid 46 is energized, wheel 54 drives blade 34 with no lag, because spring 64 biases pin 60 against the driving end of slot 62. When the solenoid-energized forward stroke of wheel 54 has been completed, blade 34 continues to travel until pin 60 reaches the opposite extremity of slot 60. Thereafter, blade 34 is restored by spring 64 to its proper starting relationship to wheel 54. Area B of blade 32 closes the lens opening during the retarded return travel of aperture 40 in blade 34 across the optical axis.

Instead of having spring 64 extend to screw 52'' in the arrangement shown, where inertia of blade 34 is relied upon for allowing faster return of blade 32 than blade 34, a post may be provided on plate 12 adjacent screw 52'; and spring 64 extending from screw 60 to such a post would over-center during the forward and reverse strokes of wheel 54. In this way, reliance on inertia for enforcing lagging return of blade 34 can be avoided if, in some applications, it should prove unduly critical.

For opening the shutter manually, push button 66 outside housing 10 is provided. This push button is on a shaft 68 that arcuately drives a lug 70 upstanding rigidly from wheel 50. The stroke is long enough to move apertures 50 and 42 into alignment with lens opening 24. A suitable supporting and light-sealing tube 72 is provided for shaft 68.

Wires 53 coordinate operation of the shutter blades 32 and 34 during solenoid operation and this wire constitutes a mechanical energy transmission during operation of the push-button. During the relatively slow operation of the push-button, there is a relatively slight force developed in wire 53 for operating blade 34. If the force were great as, for example, with the entire sudden electrical energy applied to solenoid 44, the sudden pull in wire 53 would be great. This would produce a stress tending to slant armature $a$ of this driving solenoid, with resultant frictional binding. It is contemplated that special bearings can be provided to accommodate such stress. However, the separate energization of each blade by means of its own rotary solenoid avoids this difficulty. Incidentally, the adjustment of wires 53 should be such that the slack in the wire is barely taken up without tensioning the wire. Tension would produce the foregoing objectionable tilt of the solenoid axes.

The operation of the shutter blades is diagrammatically illustrated in Fig. 3. As blades 32 and 34 swing arcuately, the holes 40 and 42 (represented in dotted lines in Fig. 3) travel arcuately as represented by the arrows, until at the start of their overlap an opening is developed as represented by the solid lines, which is centered in lens opening 24 when the shutter adjustment is proper.

Evidently many blades can be used, rather than the two shown. Where the double-exposure problem exists, as in the case detailed above, one of the blades should be of the lost-motion type represented in the drawings at the right, and the others advantageously are mounted to travel with their respective solenoids as in the case of blade 32 with its aperture 40 carried by solenoid 44, Fig. 4 shows the operation of a three-blade shutter wherein the operating solenoids of the shutter blades are evenly spaced about lens opening 24, one solenoid having the lost-motion operating mechanism of the type described in connection with blade 34 and aperture 42, and the other blades with respective apertures 40 and 40' having fixed connection to their operating solenoids. The shutter opens outward, starting from the center of the lens opening, and it closes toward the center of the lens opening, whether considering the form in Fig. 3 or Fig. 4.

Having thus described a specific embodiment of my invention in detail and pointed to certain of its important attributes, what I claim is:

1. In a camera, a plate having an opening therein, a first shutter blade having an aperture therein and mounted for oscillation so that the aperture is aligned with the plate opening both during a forward stroke and during a return stroke of the blade, impulse-type operating means for operating said shutter blade in said forward stroke, spring operating means for reversely operating and resetting said first shutter blade automatically at the end of said forward stroke, a second blade movable across said opening, a lost-motion coordinating connection between said blades, spring bias means for taking up the lost motion of said lost-motion connection during one of said strokes of said first shutter blade for establishing a first relationship between the blades, the inertia of said second blade and said lost-motion connection causing relative displacement between said blades and establishing a second relationship between the blades during the other of said strokes of said first shutter blade, said blades being in one of said relationships during said forward stroke and causing said opening and said aperture when aligned with each other to be unobstructed by said second blade, and said blades being in the other of said relationships during said return stroke and causing said opening and said aperture when aligned with each other to be obstructed by said second blade during said return stroke.

2. A camera having a lens opening, a pair of shutter blades at least one of which has an aperture and said aperture being normally offset from said lens opening and said blades being mounted for oscillation across said lens opening so that the aperture in said one blade moves into alignment with and past said lens opening both during a forward exposure stroke and during a reverse resetting stroke, impulse operating means for moving said shutter blades through their respective forward strokes, spring operating means for operating said blades through respective reverse resetting strokes along paths opposite said forward strokes, respectively, a lost-motion connection between the other of said blades and said operating means providing for a first relationship between said blades in the respective forward strokes of the blades wherein said aperture in said one of said blades is unobstructed by said other of said pair of blades when said aperture traverses said lens opening and said lost-motion connection also providing for a second relationship between said blades in the respective reverse strokes of said blades wherein said aperture in said one of said blades is covered by said other of said blades as said aperture traverses said lens opening, spring means effective to take up the lost motion in the lost motion connection thereby to establish one of said relationships of the blades during one of their said respective strokes, the inertia of said one of said blades together with said lost motion connection being effective to change said one of said relationships between the blades to the other of said relationships by causing relative displacement between said blades during the other of said strokes, whereby operation of said blades by said impulse operating means produces momentary alignment of said aperture with said lens opening without obstruction by said other of said blades, at the end of which operation said spring operating means operates said blades reversely with said aperture in said one blade covered by the other of said blades as said aperture passes by said lens opening.

3. In a camera, a member having a lens opening, a rotary solenoid having an armature operable in an arcuate power forward stroke and in a short, axial power stroke concurrent with said arcuate stroke and having a spring biasing the armature toward a normal rest position, electric impulse means for operating the armature in said concurrent power strokes, and the spring returning the armature through a return arcuate stroke and to said normal rest position after each said concurrent power strokes, a first shutter blade fixed to said armature for operating therewith as a unit, said blade being normally supported against said member and disposed to close off said lens opening and said first shutter blade having an aperture normally disposed at one side of said lens opening, said first shutter blade being operable by said armature to move said aperture into alignment with said lens opening and therebeyond during said arcuate power stroke, said first shutter blade moving said aperture reversely into alignment with said lens opening and therebeyond during the return arcuate stroke of the armature, said armature being arranged to move said first shutter blade bodily away from said member having said lens opening both during said axial power stroke and until return thereof by said returning spring, a second shutter blade having a lost-motion mechanical coupling to said first shutter blade, said lost-motion coupling interconnecting said blades to constrain the second blade to move in timed relationship with said first shutter blade and allowing limited relative shift between the blades to provide for two different relationships therebetween, said relationships including a first relationship in which said aperture of said first shutter blade is unobstructed when said aperture is aligned with said lens opening and a second relationship in which said aperture of said first shutter blade is closed off by said second blade when said aperture is aligned with said lens opening, and spring bias means effective to take up the lost motion of said lost-motion mechanical coupling for establishing one of said relationships between said blades when at rest and during one of said arcuate strokes of said first blade, the inertia of said second blade and the lost-motion coupling being effective to cause relative displacement between said blades and thereby to produce the other of said relationships between the blades during the other of said arcuate strokes of said first blade, whereby said second blade is effective to close off said lens opening when said aperture of said first shutter blade is aligned with the lens opening during one of said arcuate strokes and said lens opening is unobstructed by said second shutter blade when said aperture of said first shutter blade is aligned with the lens opening during the other of said arcuate strokes.

4. Apparatus in accordance with claim 3 wherein a separate rotary solenoid is provided for each shutter blade, wherein the armatures of said solenoids have flexible wire coordinating connections and wherein said lost-motion mechanical coupling includes a lost-motion connection interposed between said second blade and the armature of its rotary solenoid.

5. Apparatus in accordance with claim 4 wherein each blade has an aperture, and wherein said blades move in different directions and carry the apertures thereof into simultaneous alignment with said lens opening during said one of said arcuate strokes.

6. In a camera, a member having a lens opening, a rotary solenoid having an armature operable in a forward arcuate power stroke and in a short axial power stroke concurrent with said arcuate power stroke and having a spring biasing the armature toward a normal rest position, electric impulse means for operating the armature in said concurrent power strokes, and the spring operating the armature through a return arcuate stroke to said normal rest position after each said concurrent power strokes, a first shutter blade fixed to said armature for operating therewith as a unit, said first shutter blade being normally supported against said member and normally disposed to close off said lens opening and said first shutter blade having an aperture therein normally disposed at one side of said lens opening and movable across and beyond said lens opening during said arcuate power stroke and being reversely movable across said lens opening during said return arcuate stroke of the armature, said armature being arranged to move said blade bodily away from said member both during said axial stroke and until return thereof to said rest position by said spring, a second blade having a mechanical coupling to said first blade, said coupling including a positive drive connection to said first shutter blade during one of said arcuate strokes of said armature and of said first shutter blade fixed thereto and said positive drive connection establishing a first relationship between said blades during said one of said arcuate strokes, said coupling being of a form to afford relative shifting motion between the blades, thereby providing for a second relationship between said blades, and spring bias means acting on said second blade for establishing one of said relationships between said blades when the blades are at rest and during one of said arcuate strokes, the inertia of said second blade and said mechanical coupling being effective to establish the other of said relationships between the blades during the other of said arcuate strokes, said second blade being effective to close off said lens opening when said aperture of said first shutter blade is aligned with the lens opening while one of said relationships is in effect, and said lens opening being unobstructed by said second shutter blade when the aperture of said first shutter blade is aligned with the lens opening while the other of said relationships is in effect.

7. In a camera, a plate having an opening therein, a first shutter blade having an aperture therein and mounted for forward and return strokes of oscillation so that the aperture moves from one side of said opening into alignment with said opening and therebeyond during each forward stroke and again during each return stroke of said first shutter blade, impulse-operating means and spring returning means for oscillating said shutter blade through said forward and return strokes, respectively, a second blade movable across said opening in said plate and said second blade having a mechanical coupling to said first blade, said coupling including a positive drive connection to the second blade from the first shutter blade effective during strokes of oscillation of said first shutter blade in one direction, said drive connection including a driving portion movable in unison with said first shutter blade and being in positive drive relation to said second blade during said strokes of oscillation of said first blade in said one direction, said coupling being of the form to afford relative shifting motion between said second blade and said driving portion of said mechanical coupling, and spring bias means acting on said second blade for establishing a normal at-rest relationship between said blades and said relationship also being in effect during strokes of oscillation of said first shutter blade in a particular direction, the inertia of said second blade and said mechanical coupling causing said relative shifting motion and thereby being effective to produce a second relationship between the blades different from said at-rest relationship during the strokes of oscillation of said first blade in the direction opposite to said particular direction, said second blade being effective in the successive strokes of said first shutter blade in opposite directions to leave the opening in the plate unobstructed and to close off said opening in said plate, respectively, when said aperture in said first shutter blade is brought into alignment with the opening in said plate in successive strokes of said first blade.

8. A camera including a member having a lens opening, a pair of shutter blades pivotally mounted for conjoint operation, coordinated reciprocable-type electrical impulse operating means including an electromagnet for driving said shutter blades across said opening in respective substantially concurrent forward strokes to produce an exposure and spring-return means for operating said blades reversely across said opening in respective substantially concurrent return strokes, said blades having positive drive coupling means therebetween establishing a first relationship therebetween during said respective forward strokes, said blades having mutually complementing portions providing an exposure opening momentarily aligned with said lens opening during said forward strokes when said blades are in said first relationship, and a lost motion connection between one of the blades and said operating means for said shutter blades, said lost-motion connection and the inertia of said one blade causing relative displacement between said blades and thereby causing a second relationship between the blades to be established different from said first relationship during the respective return strokes thereof, said blades in said second relationship complementing each other to close off said lens opening at all times during said return strokes thereof, and a spring acting on said one blade for establishing one of said relationships between the blades when at rest.

9. A camera including a housing having a lens opening through which an exposure may be made, and means to produce an exposure including a pair of blades obstructing said opening at rest and mounted for respective forward and return strokes across said lens opening, actuating means for operating said blades in said strokes, said actuating means including electrical impulse means comprising an electromagnet for producing said respective forward strokes of said blades abruptly and spring means for producing said respective return strokes automatically at the conclusion of said respective forward strokes, means coupling said blades to said actuating means and to each other, said coupling means including a lost-motion connection between one of said blades and said actuating means enabling said blades to shift in relation to each other to assume either of two relationships, namely, a first relationship in which said blades are timed relative to each other to momentarily expose said lens opening during their respective forward strokes thereacross and a second relationship in which said blades are timed relative to each other to close off said lens opening continuously during their respective return strokes thereacross, the inertia of said one of said blades being effective to constrain and time it to assume said first relationship relative to the other of said pair of blades during said forward stroke thereof as produced abruptly by said electrical impulse means and being further effective at the end of the respective forward strokes and at the start of the respective return strokes of said blades to shift said one blade from said first relationship relative to the other of said pair of blades to said second relationship and to retain said second relationship during said respective return strokes of said blades.

10. In a camera, a member having an exposure opening, a rotary solenoid having an armature operable in an arcuate power forward stroke, and having a spring biasing the armature toward a normal rest position, electric impulse means for operating the armature in said power stroke, and the spring operating the armature reversely in an arcuate return stroke to said normal rest position after its power stroke, a first shutter blade fixed to said armature for operation therewith as a unit, said blade being normally disposed to close off said exposure opening and said blade being movable across said exposure opening to make an exposure, a second blade having a mechanical coupling to said first blade, said coupling including a positive drive connection from said second blade to said first shutter blade in one of said arcuate strokes of operation, said coupling being formed to afford relative shifting motion between the blades during the other of said arcuate strokes of the first blade, spring bias means acting on said second blade for establishing a normal at-rest relationship between said blades in which said positive drive connection is established, the inertia of said second blade and said mechanical coupling being effective to produce a relationship different from said at-rest relationship between the blades during one of the oscillatory strokes thereof, said second blade being effective with the first blade to close off the exposure opening throughout one of said strokes, and said second blade being effective with said first blade to produce an exposure during the other of said strokes.

11. A camera having a lens opening, a pair of shutter blades at least one of which has an aperture and said aperture being normally off-set from said lens opening and said blades being mounted for oscillation across said lens opening so that the aperture in said one blade moves into alignment with and past said lens opening both during a forward exposure stroke and during a reverse resetting stroke, impulse operating means for moving said shutter blades through their respective forward strokes, spring operating means for operating said blades through respective reverse resetting strokes along paths opposite their respective forward strokes, a first one of said pair of blades having a positive connection to both said impulse operating means and said spring operating means, a driving device also having a positive connection to both of said operating means, a lost-motion connection from said driving device to the second one of said pair of blades, said lost-motion connection including means on said driving device providing oppositely facing driving surfaces and means on said second blade providing oppositely facing companion driven surfaces cooperable with and as a companion to a respective one of said driving surfaces, said driving and driven surfaces being spaced apart differently in relation to each other to impart the desired lost-motion and to limit the relative shift between the blades for establishing a mutually obstructing relationship during their resetting strokes across the lens opening and to limit the reverse relative shift between the blades for establishing an exposure relationship between the blades during the forward strokes thereof in which said blade aperture is unobstructed when it is momentarily aligned with the lens opening, said second blade having an amount of inertia proportioned to operate the lost-motion connection and thereby to change said blades from one of said relationships to the other.

12. A camera including a member having a lens opening, a pair of shutter blades pivotally mounted for conjoint operation, electrical impulse operating means including an electromagnet for driving said shutter blades across said opening in respective substantially concurrent forward strokes to produce an exposure and spring return means for operating the blades reversely across said opening in respective substantially concurrent return strokes, said operating means and said spring return means being connected to each other and having a positive mechanical connection to one of said blades, a lost-motion connection between said blades allowing mutual shift in their relationship to each other, said lost-motion connection being arranged to provide an indirect drive connection from said operating means and said spring return means to the other of said blades and said lost-motion connection including coacting parts providing positive opposite limits for establishing the range of mutual shift of the blades, said blades having one relationship at one limit of the lost-motion connection wherein an exposure is made as the blades move across the lens opening in their forward strokes, and said blades having another relationship at the opposite limit of the lost-motion connection, in which they act jointly to cover the lens opening during their return strokes, the inertia of said other of said blades being depended upon and effective to shift said other of said blades relative to said one blade to change from one of said relationships to the other in the course of change of motion of said one blade.

References Cited in the file of this patent

UNITED STATES PATENTS

| | | |
|---|---|---|
| 1,402,486 | Folmer | Jan. 3, 1922 |
| 2,209,639 | Tonnies | July 30, 1940 |
| 2,283,586 | Stechbart | May 19, 1942 |
| 2,345,365 | Steiner | Mar. 28, 1944 |
| 2,347,699 | Magnus et al. | May 2, 1944 |
| 2,384,639 | Riddell | Sept. 11, 1945 |
| 2,463,206 | Robertson | Mar. 1, 1949 |
| 2,496,880 | Leland | Feb. 7, 1950 |
| 2,730,937 | Martin et al. | Jan. 17, 1956 |